A. F. W. PARTZ.
Evaporating Apparatus.
No. 17,448. Patented June 2, 1857.
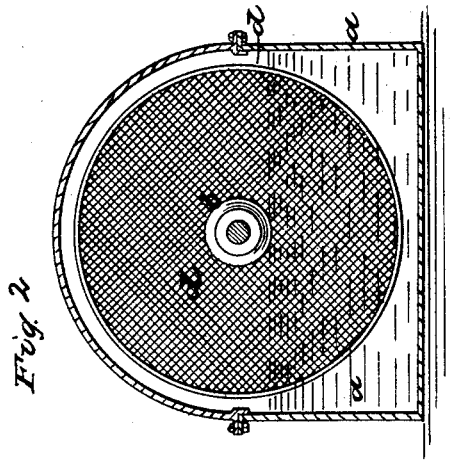
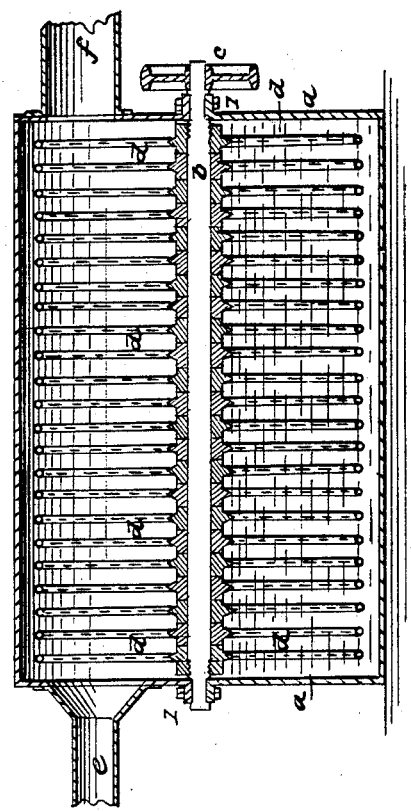

UNITED STATES PATENT OFFICE.

AUGUST F. W. PARTZ, OF NEW YORK, N. Y.

IMPROVED APPARATUS FOR CONDENSING VAPORS AND GASES AND FOR EVAPORATING LIQUIDS.

Specification forming part of Letters Patent No. 17,448, dated June 2, 1857.

*To all whom it may concern:*

Be it known that I, AUGUST F. W. PARTZ, of the city, county, and State of New York, have invented new and useful improvements in apparatus for facilitating the absorption of vapors and gases, or the caloric therefrom, or light substances mixed therewith and floating therein, and also for facilitating evaporation in distillations in the manufacture of salt, sugar, &c.; and I do hereby declare that the following is a full and exact description thereof, reference being had to the accompanying drawings, making part of this specification, wherein—

Figure 1 is a vertical longitudinal section, and Fig. 2 a vertical cross-section, of the apparatus.

The object of my invention is the more conveniently and effectually bringing vapors or gases into contact with the absorbing-liquid, or liquid to be evaporated, an extended film of which is continuously or successively developed and renewed within a comparatively small space, in the manner hereinafter specified.

In the drawings, $a$ is a vessel, made of sheet-iron or any other suitable material. Through this vessel passes a shaft, $b$, which is supported in journals 1 1, and driven at the desired speed by power applied to the pulley $c$, or otherwise, in any convenient manner. $d\ d\ d$ are disks of woven wire, perforated metal, fibrous substances, or other equivalent material properly attached to the said shaft at suitable distances apart. The semi-cylindrical hood, which forms the covering part of the vessel $a$, incloses the upper halves of the disks nearly in contact with their peripheries.

The operation is as follows: The vessel $a$ being filled with the absorbing-liquid, or liquid to be evaporated to about the height shown, the disks $d\ d\ d$ elevate and suspend by their revolution a film of the liquid, which adheres to them, and present the same to the vapors or gases that are led into the vessel by means of the trunk or pipe $e$, or in any other suitable manner, and caused by the covering-hood to disseminate among the perforated disks. Thus the absorption or evaporation is promoted. The opening $f$ is for the escape of vapors generated in the apparatus, or such portions of the introduced vapors or gases as are not to be absorbed. It is to be closed when a perfect absorption is required.

It is apparent that, instead of disks, screw-formed plates or wings of perforated metal or equivalent material may be substituted to the same effect.

It is well known that the absorption of vapors and gases, or the caloric therefrom, or light substances suspended therein, or evaporation, is practiced in the arts for various purposes and with very different intentions—sometimes for reducing vapors and gases to their fluid state, or for uniting them with fluids, to obtain new chemical products; sometimes for diffusing gases through fluids to obtain effervescent or other compounds; sometimes for removing noxious vapors, &c.; sometimes for the manufacture of salt, sugar, &c. To accomplish these different objects additional apparatus for the introduction or discharge of the vapors or gases, òr for the removal and supply of the absorbing-liquids, or for the collection of sediments, or otherwise, may be necessary. These it is not my present purpose to present or secure by Letters Patent, but to limit myself to my apparatus for facilitating aborptions and evaporations of the above description in whatever connection they may be found useful.

I am aware that disks similar to mine, as well as screw-formed plates, have been used for somewhat similar purposes; but when used the hood inclosing them was placed at a distance from their outer peripheries—such as to allow the gas or vapor, as it circulated therein, to pass in a great degree through the space between the hood and the outer edges of the disks—thus failing to come in contact with the liquid adhering to the face of the disks; but in my apparatus the hood fits so closely around the edges of the disks that the gas or vapor forced into it is compelled to pass successively against the full face of each disk, thence through its perforations, and thence against the face of the next disk and through it, so that the whole film of liquid on each disk is brought into contact with the gas or vapor, thus greatly increasing evaporation and absorption.

The apparatus represented in my drawings is so combined and arranged as to be adapted to the absorption of steam, carbonic acid, &c., or to evaporation in the manufacture of salt, by means of an injected current of heated air; but I do not limit myself to these.

What I claim as my improvement in apparatus for facilitating the absorption of vapors and gases, &c., and the evaporation of liquids, and desire to secure by Letters Patent, is—

The combination of the revolving perforated disks or sheets with the vessel containing the liquid of absorption or evaporation, into which they dip, and the hood or cover which guides the vapors and gases that are introduced through the unimmersed portions of said disks, substantially in the manner and for the purpose herein described.

AUGUST F. W. PARTZ.

Witnesses:
R. N. HAVENS,
D. H. LYMAN.